(12) United States Patent
Johansson

(10) Patent No.: US 8,553,110 B2
(45) Date of Patent: Oct. 8, 2013

(54) METHOD AND CAMERA FOR PROVIDING AN ESTIMATION OF A MEAN SIGNAL TO NOISE RATIO VALUE FOR AN IMAGE

(75) Inventor: Filip Johansson, Malmo (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 13/558,751

(22) Filed: Jul. 26, 2012

(65) Prior Publication Data

US 2013/0027589 A1 Jan. 31, 2013

Related U.S. Application Data

(60) Provisional application No. 61/512,989, filed on Jul. 29, 2011.

(30) Foreign Application Priority Data

Jul. 27, 2011 (EP) ..................................... 11175609

(51) Int. Cl.
H04N 5/217 (2011.01)

(52) U.S. Cl.
USPC ........................................................ 348/241

(58) Field of Classification Search
None
See application file for complete search history.

(56) References Cited

U.S. PATENT DOCUMENTS

| 6,650,774 | B1 | 11/2003 | Szeliski |
| 2004/0247196 | A1 | 12/2004 | Chanas et al. |
| 2005/0244071 | A1 | 11/2005 | Zaharia et al. |
| 2006/0039622 | A1 | 2/2006 | Casale et al. |
| 2007/0297019 | A1 | 12/2007 | Foi et al. |
| 2008/0284872 | A1 | 11/2008 | Asoma |
| 2009/0059039 | A1 | 3/2009 | Smith et al. |
| 2009/0091645 | A1 | 4/2009 | Trimeche et al. |
| 2009/0309998 | A1* | 12/2009 | Grosvenor et al. ........... 348/241 |

(Continued)

FOREIGN PATENT DOCUMENTS

| JP | 11341344 A | 12/1999 |
| JP | 2005341555 A | 12/2005 |
| JP | 2006074252 A | 3/2006 |
| JP | 2008228058 A | 9/2008 |

OTHER PUBLICATIONS

Gravel et al., "A Method for Modeling Noise in Medical Images," IEEE Transactions on Medical Imaging, 2004, pp. 1221-1232, vol. 23, No. 10.

(Continued)

*Primary Examiner* — Sinh Tran
*Assistant Examiner* — Jason Flohre
(74) *Attorney, Agent, or Firm* — Volpe and Koenig, P.C.

(57) ABSTRACT

A method and a camera provide an estimation of a mean signal to noise ratio value for an output image comprising a number of pixels, wherein each pixel of the output image has a pixel value. An image histogram divided into bins, the image histogram having information regarding the distribution of pixel values among the pixels of the output image. Each bin has a set of pixels having pixel values within a predetermined range. For each bin of the image histogram, a signal to noise ratio value of that bin may be attributed and weighted with the number of pixels in the set of pixels of that bin. The weighted signal to noise ratio values of the bins are summed, and the sum may then be divided by the total number of pixels of the output image or the total number of pixels in the bins of the image histogram.

15 Claims, 1 Drawing Sheet

(56) References Cited

U.S. PATENT DOCUMENTS

| | | | |
|---|---|---|---|
| 2010/0310190 A1* | 12/2010 | Lin | 348/241 |
| 2011/0064327 A1* | 3/2011 | Dagher et al. | 382/263 |
| 2012/0169905 A1* | 7/2012 | Ovsiannikov et al. | 348/252 |

OTHER PUBLICATIONS

Rank et al., "Estimation of Image Noise Variance," IEE Proceedings: Vision, Image and Signal Processing, 1999, pp. 80-84, vol. 146, No. 2.

Sijbers et al., "Automatic estimation of the noise variance from the histogram of a magnetic resonance image," Physics in Medicine and Biology, 2007, pp. 1335-1348, vol. 52, No. 5.

Buades et al., "Multi image noise estimation and denoising," 2010, pp. 1-28, http://hal.archives-ouvertes.fr/docs/00/51/08/66/PDF/Burst_Hal.pdf.

Olsen, "Noise Variance Estimation in Images," Proc. 8th SCIA, 1993, pp. 25-28.

Waegli, "Investigations into the Noise Characteristics of Digitized Aerial Images," Int. Arch. For Photogr. and Remote Sensing, 1998, http://citeseerx.ist.psu.edu/viewdoc/download?doi=10.1.1.30.5651&rep=rep1&type=pdf.

* cited by examiner

METHOD AND CAMERA FOR PROVIDING AN ESTIMATION OF A MEAN SIGNAL TO NOISE RATIO VALUE FOR AN IMAGE

CROSS REFERENCE TO RELATED APPLICATION

This application claims the benefit of European Patent Application No. EP11175609.1 filed on Jul. 27, 2011 and U.S. Provisional Patent Application No. 61/512,989, filed on Jul. 29, 2011, which is incorporated by reference as if fully set forth.

FIELD OF INVENTION

The present invention relates to a method for providing an estimation of a mean signal to noise ratio value for an output image. The present invention also relates to a camera arranged for providing an estimation of a mean signal to noise ratio value for an output image.

BACKGROUND

Images captured with digital cameras using image sensors will pick up noise from a variety of sources such as read noise $\sigma_r$ and/or photon shot noise $\sigma_{ph}$. Many further uses of these images require that the noise in the images will be reduced. In order to reduce the noise in the image, noise filtering is used. When applying noise filtering to an image it is important to adapt the noise filtering method and the strength of the noise filtering to how much noise that is present in the image. A Signal to Noise Ratio value (SNR value) may quantify the strength of an image signal in relation to the noise in the image and is hence an important parameter when applying noise filtering to an image. In particular an estimation of the mean SNR value for a whole image may be very useful when applying noise filtering to an image. A further field of use for a mean SNR value is to use the mean SNR value as an indication of when to activate day/night functionality in a camera. A small, or a decreasing, mean SNR value indicating that the image noise is large, or increasing, in relation to the image signal may, for example, indicate that the night functionality of the camera needs to be activated. A further field of use for a mean SNR value is to use the mean SNR value in auto-exposure algorithms for finding an exposure time generating an acceptable noise level.

The SNR value for a stochastic variable S is defined (definition used for imaging) as:

$$SNR = 20\left(\frac{\log(E[S])}{\sigma[S]}\right) \quad \text{Equation (A)}$$

where E[S] is the expectancy value of the signal, S, and $\sigma$ is the standard deviation of the signal S. In an image processing pipeline, it is very costly in terms of processing capacity to calculate the SNR value from image data using Equation (A) and an estimated SNR value is hence needed. For cameras using a single exposure to generate an output image, this is often done by using the average luminance value in the scene as the expectancy value of the signal and using pre-calculate read noise values for the standard deviation of the signal. However, this approach may not work for multi-exposure images, such as multi-exposure HDR images. This is because it consists of images stitched from different exposures, with different exposure times, which for example implies that noise levels and/or sources may vary between different exposure regions of the stitched image, which also implies that the SNR value is different in the different exposure regions of the stitched image.

Accordingly there is a need for an alternative method for estimating a mean SNR value of an image.

SUMMARY

In view of the above, a method and a camera are described herein for estimating a mean SNR value for an image.

A method and a camera suitable for estimating a mean SNR value for an output image being stitched from a plurality of images are also described.

In particular, according to a first aspect of the invention, a method for providing an estimation of a mean signal to noise ratio value for an output image comprising a number of image pixels wherein each image pixel of the image having a pixel value is provided. The method comprises providing an image histogram divided into bins, the image histogram comprising information regarding the distribution of pixel values among the image pixels of the output image, each bin comprising a set of image pixels having pixels values within a predetermined range. A SNR value is attributed for each bin of the image histogram. For each bin of the image histogram, the SNR value of that bin is weighted with the number of image pixels in the set of image pixels of that bin. The method further comprises summing the weighted SNR values of the bins and dividing the sum of weighted SNR values of the bins by the total number of image pixels of the output image or the total number of image pixels in the bins of the image histogram.

According to this, a method for providing an estimated mean SNR value for an image is achieved. By providing an estimated mean SNR value for an output image it will be possible to use this mean SNR value in order to perform noise filtering on the output image. Moreover, the estimated mean SNR value may also be used for activating day/night functionality in a camera. A further field of use is to use the mean SNR value in auto-exposure algorithms. An important benefit with the above described method is that it provides an estimated mean SNR value for the image at a low calculation cost.

The output image may be any kind of image comprising a number of image pixels, each image pixel of the output image having a pixel value. The output image may be an image being obtained by stitching a plurality of other images. Such a stitched output image may be a multi-exposure image such as a multi-exposure HDR-image, a panorama image or any other kind of image being obtained by stitching two or more images. The output image may also be a subset of an image. That is, the output image may be a cutout from another image.

The pixel value of an image pixel of the output image normally is an output signal or combinations of output signals from an image sensor. The image sensor is normally divided into sensor pixels. Each of the sensor pixels of the image sensor is arranged to output a pixel value. The pixel value is a function of the number of received photons in a corresponding sensor pixel of the image sensor. The pixel value may for example be embodied by analog-to-digital units from the image sensor unit or other quantities representing the output from image sensor. The pixel values for at least some of the sensor pixels constitute pixel values of corresponding image pixels of an image captured by the image sensor. That is, pixel values from some of the sensor pixels may for example be used to calculate the dark current and/or other characteristics of the image sensor, other pixel values from some of the sensor pixels may for example be regarded as non-relevant for the image and pixel values of some other sensor pixels may be used to derive the pixels values of the image captured by the image sensor.

The image histogram comprising information regarding the distribution of pixel values among the image pixels of the output image may be provided by the image sensor used to capture the output image. In the case of a multi-exposure image the image histogram represents the distribution of pixel values after combining the plurality of exposures. Each bin in the image histogram represents a range of pixel values. Accordingly, the image histogram comprises information regarding the number of image pixels having a pixel value within each bin.

According to an embodiment, the output image may comprise image pixels having pixel values originating from image pixels of a plurality of images. That is, the output image may be an image being formed by stitching a plurality of images. Thus, the output image may be a multi exposure image, such as a multi exposure-HDR image or a panorama image formed by combining two or more images, etc.

According to another embodiment, the plurality of images may have different exposure times. This is the case for a multi exposure image, such as a multi exposure-HDR image.

According to another embodiment, the pixel value for a first pixel in the output image may be a pixel value from a pixel of a first image of the plurality of images and the pixel value for a second pixel in the output image may be a pixel value from a pixel of a second image of the plurality of images. That is the output image comprises pixels comprising image data from only one image of the plurality of images used to form the output image. This is true for any kind of multi exposure output image.

According to yet another embodiment, a pixel value for at least one of the pixels of the output image may be a pixel value being obtained by combining pixel values of pixels from at least two images of the plurality of images. That is the output image comprises pixels comprising image data from at least two images of the plurality of images used to form the output image. The pixel values of pixels from at least two images of the plurality of images may be combined in many different ways being known by the skilled person. One such way to combine the pixel values of pixels from at least two images of the plurality of images is described below in the description of embodiments. Further ways of combining the pixel values of pixels from at least two images of the plurality of images are described in patent applications PG Pub US2009/0059039 and PG Pub US2010/0310190. Combining pixel values from two or more images may be made for any kind of multi exposure image. In case of a multi-exposure HDR-image, this corresponds to transition regions where image data from at least two images of the plurality of images are used in order to achieve the higher dynamic range of the output image. In case of a panorama image, this corresponds to a region of the image having contributions from at least two of the images making up the panorama image, i.e. the overlapping region of the at least two images making up the panorama image.

According to a further embodiment, the act of attributing a SNR value for the bin of the bins of the image histogram comprising the pixel having a pixel value being obtained by combining pixel values of pixels from at least two images of the plurality of images may comprise combining SNR values for the pixel values of the pixels from the at least two images of the plurality of images.

According to another embodiment, a computer-readable recording medium is provided. The computer-readable recording medium having recorded thereon a program for implementing the method according to any one of the embodiments described above when executed on a device having processing capabilities.

According to yet another embodiment, a camera is arranged for providing an estimation of a mean SNR value for an output image comprising a number of pixels each pixel of the image having a pixel value. The camera comprises an image sensor being arranged to capture pixel values used to derive pixel values of the pixels of the output image; an image histogram provider being arranged to provide an image histogram comprising information regarding the distribution of pixel values among the pixels of the output image. Each bin of the image histogram comprises a set of pixels having pixels values within a predetermined range. The camera further includes a calculator and a SNR value attributor being arranged to attribute a SNR value for each bin of the image histogram. The calculator is arranged to calculate the mean SNR value by weighting, for each bin of the image histogram, the SNR value of that bin with the number of pixels in the set of pixels of that bin, summing the weighted SNR values of the bins, and dividing the sum of weighted SNR values of the bins by the total number of pixels of the output image or the total number of pixels in the bins of the image histogram.

According to an embodiment, the camera may further comprise an image combiner being arranged to combine pixel values of pixels originating from a plurality of images captured by the image sensor in order to form the output image.

According to another embodiment, the plurality of images may be captured using different exposure times.

According to another embodiment, the image combiner may be arranged to form the pixel value of a first pixel of the output image using a pixel value from a pixel of a first image of the plurality of images and to form the pixel value of a second pixel of the output image using a pixel value from a pixel of a second image of the plurality of images.

According to yet another embodiment, the image combiner may be arranged to combine pixel values from pixels of at least two images of the plurality of images captured by the image sensor in order to form a pixel value for at least one pixel of the pixels of the output image.

According to a further embodiment, the SNR value attributor is arranged to combine SNR values of the pixel values of the pixels of the at least two images of the plurality of images used to obtain the pixel values of the at least one pixel of the pixels of the output image in order to attribute the SNR for the bin of the bins of the image histogram comprising the at least one pixel of the pixels of the output image.

According to another embodiment, the camera further comprises a memory comprising tables of SNR values as a function of pixel values or a predefined function and parameter values for calculating SNR values as a function of pixel values.

According to yet another embodiment, the SNR value for each bin of the image histogram is dependent upon the temperature of the image sensor.

BRIEF DESCRIPTION OF THE DRAWINGS

These and other aspects of the present invention will now be described in more detail, with reference to appended drawings showing embodiments. The figures should not be considered limiting the invention to the specific embodiment; instead they are used for explaining and understanding the invention. Like numbers refer to like elements throughout the figures.

DETAILED DESCRIPTION OF THE PREFERRED EMBODIMENTS

Figure 1:
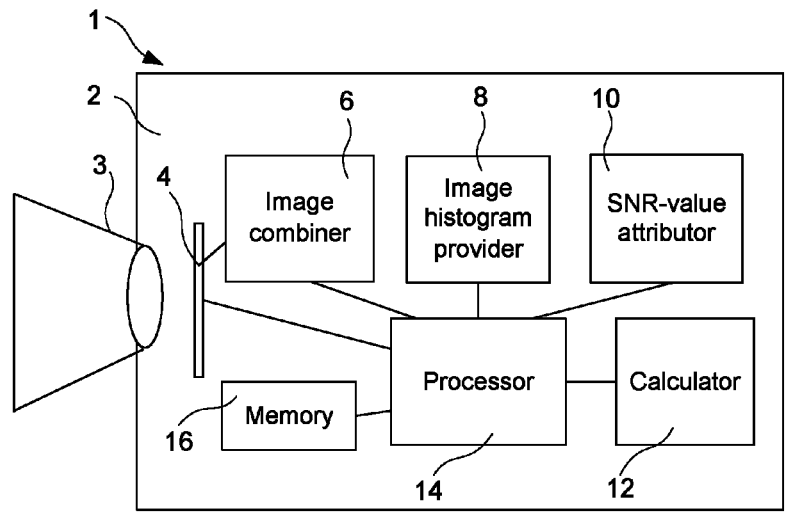
FIG. 1 is a schematic view of a camera according to an embodiment.

Calculating a mean SNR value using equation (A) is costly in terms of processor capacity and it may not give an accurate result for stitched output images, like multi-exposure images.

The methods and camera described herein solve the problem of providing, at a low processing cost, an estimation of a mean SNR value for an output image. In particular, an estimated mean SNR value is provided for a stitched output image, and especially a stitched output image comprising image data from a plurality of images registered at different exposure times.

The stitched output image may be produced using a multi-exposure technology to improve the dynamic range of images, a technology area which sometimes also may be called High Dynamic Range (HDR), Wide Dynamic Range (WDR) or Extended Dynamic Range technology. Alternatively, the stitched output image may be produced using a panorama technology, i.e., stitching a plurality of images in order to achieve a panoramic view. Due to the nature of a stitched output image comprising image data captured using for example different exposure times, which for example implies that noise levels and/or sources may vary between different exposure regions of the stitched image, the SNR value will vary between the different image pixels of the stitched output image, see below for a more detailed discussion regarding SNR values of pixel values of image pixels of a stitched output image, such as a multi-exposure image. An estimated mean SNR value will hence be beneficial in describing SNR of the output image on average. The estimated mean SNR value may for example be used as input for noise filtering of the output image and/or activating day/night functionality in a camera and/or finding a suitable exposure time in an auto-exposure algorithm.

According to the methods and camera described herein, an estimated mean SNR value for the output image is provided at a low calculation cost.

A method for calculating an estimated mean SNR value comprises using an image histogram describing the distribution of pixel values of the image pixels in the output image and precalculated tables or one or more predefined functions and parameters for calculating expected SNR values for each pixel value range of the image histogram, i.e., for each bin of the image histogram. The estimated mean SNR value is then calculated by weighting, for each bin of the image histogram, the SNR value of that bin with the number of image pixels in the set of image pixels of that bin, summing the weighted SNR values of the bins, and dividing the sum of weighted SNR values of the bins by the total number of image pixels of the output image or the total number of image pixels in the bins of the image histogram.

The image histogram describing the distribution of pixel values in the output image may be provided by an image sensor or an image processing pipeline. In the case of the output image being a stitched output image, such as a multi-expose image, the image histogram represents the distribution of pixel values after combining the plurality of exposures. Each bin in the image histogram represents a range of pixel values. The pixel value is a function of the number of received photons in a corresponding sensor pixel of the image sensor. The pixel values may for example be embodied by analog-to-digital units from the image sensor or other quantities representing the image sensor output.

The precalculated tables or predefined functions and parameters for the SNR value for each bin in the image histogram may be calculated or predefined using calibration data of the image sensor, the image sensor's properties and/or the image sensor's temperature. In case of a stitched output image comprising image data from different images (e.g., images having different exposure times), the SNR value for the bin/bins comprising image pixels being formed by combining pixel values of image pixels of at least two of the different images is calculated by combining (e.g., by scaling and/or interpolation) SNR values of the pixel values of the image pixels of the at least two of the different images used to form the image pixels of the bin. How to combine pixel values of pixels from different images (e.g., images captured using different exposure times) are discussed below. Moreover, how to combine SNR values of pixel values of image pixels from different images, especially images having different exposure times, are also discussed below.

The precalculated tables and/or the predetermined functions and parameters of the SNR values as a function of different pixel values may be calculated during run time of the camera and/or determined and stored on the camera during fabrication.

In FIG. 1, an embodiment of a camera 1 for providing an estimation of a mean SNR value for an output image comprising a number of image pixels, wherein each image pixel of the image having a pixel value, is illustrated.

The camera 1 is typically a digital camera of any kind. The camera 1 may be capable of capturing still images and/or video images, using single or multiple exposure techniques. Moreover, the camera 1 may be connectable to a digital network. Further, the camera 1 may be a portable camera, a stationary camera or a camera having pan/tilt functionality. The camera 1 may be a camera for monitoring applications, such as surveillance purposes, machine vision, store compliance, business information, etc. In order to facilitate clarity in the description herein, some features of a camera are not described in full detail or may not be included or enumerated, as such description would not facilitate a better understanding of the embodiments to one skilled in the art. Moreover, the camera features presented herein should not be considered as limiting the scope. The camera 1 comprises a housing 2, a lens 3, an image sensor 4, an image combiner 6, an image histogram provider 8, a SNR value attributor 10, a calculator 12, a processor 14 and a memory 16.

The processor 14 is arranged to process and/or pass on data being generated by any of the other components of the camera 1.

The image sensor 4 are arranged to capture images. The image sensor 4 may for example be a Charge Coupled Device (CCD) sensor, a Complementary Metal Oxide Semiconductor (CMOS) sensor or similar, for registering incident light. The image sensor 4 comprises a number of sensor pixels. The image sensor 4 is arranged to output a pixel value for each sensor pixel. The pixel value of each sensor pixel is a function of the number of photons received by the sensor pixel. The pixel values for at least some of the sensor pixels constitute pixel values of corresponding image pixels of an image captured by the image sensor. That is, pixel values from some of the sensor pixels may, for example, be used to calculate the dark current and/or other characteristics of the image sensor, other pixel values from some of the sensor pixels may for example be regarded as non-relevant for the image and pixel values of the image captured by the image sensor.

For some applications of the present invention, a single image captured by the image sensor 4 is considered to be the output image. This is the case when used to estimate a mean SNR value for an output image comprising image data from the single image captured by the image sensor.

In order to form a stitched output image from a plurality of the images captured by the image sensor 4, the camera 1 comprises the image combiner 6. The image combiner 6 is arranged to combine pixel values of image pixels originating from a plurality of images captured by the image sensor 4 in order to form the image pixels of the output image, the output image now being a stitched output image. The stitched output image typically comprises image pixels having pixel values deduced from a plurality of images. A stitched output image may comprise, for example, image pixels having pixel values only originating from a first of the plurality of images, image pixels having pixel values only originating from a second of the plurality of images and/or image pixels having pixel values originating from a combination of pixel values from at least two images of the plurality of images. This is typically the case when forming a multi-exposure HDR-image or a multi-exposure panoramic image. Accordingly, the image combiner 6 is arranged to form the pixel value of a first image pixel of the output image using a pixel value from an image pixel of the first image of the plurality of images and to form the pixel value of a second image pixel of the output image using a pixel value from an image pixel of the second image of the plurality of images. Furthermore, the image combiner 6 is arranged to combine pixel values from image pixels of at least two images of the plurality of images captured by the image sensor in order to form a pixel value for at least one image pixel of the image pixels of the output image.

The image histogram provider 8 is arranged to provide an image histogram comprising information regarding the distribution of pixel values among the image pixels of the output image. In the case of a multi-exposure image, the image histogram represents the distribution of pixel values after combining the plurality of exposures. Each bin of the image histogram comprises a set of image pixels having pixels values within a predetermined range. Thus, each bin in the image histogram represents a range of pixel values. Accordingly, the image histogram comprises information regarding the number of image pixels having a pixel value within each bin.

The SNR value attributor 10 is arranged to attribute a SNR value for each bin of the image histogram. Typically, a pixel value within the range of the bin is chosen and a corresponding SNR value is calculated for that value. The pixel value in the range of the bin may vary among different implementations of the described embodiments. For example, the greatest or least value in the range of the bin may be used. Another example is to use the pixel value in the middle of the range of the bin.

The calculator 12 is arranged to calculate the mean SNR value for the output image. The calculation is made by weighting, for each bin of the image histogram, the SNR value of that bin with the number of image pixels in the set of image pixels of that bin, summing the weighted SNR values of the bins, and dividing the sum of weighted SNR values of the bins by the total number of image pixels of the output image. Alternatively, the sum of weighted SNR values of the bins may be divided by the total number of image pixels in the bins of the image histogram. These two alternatives may provide the same value. This is because the total number of image pixels in the output image and the total number of image pixels in the bins of the image histogram should be the same.

The memory 16 comprises the precalculated tables of SNR values as a function of pixel value ranges (e.g., for the pixel values of the bins). Alternatively, the memory 16 comprises one or more predefined functions and parameter values for calculating SNR values as a function of pixel values. The memory 16 may comprise the precalculated tables as well as the one or more predefined functions and parameters. The memory 16 may also comprise different tables for different image sensor temperatures, as the SNR values are dependent on the temperature of the image sensor. The tables may be precalculated using equations (G), (H), (I) and (J) together with (A) as being defined below. The predefined functions may be functions based on equations (A), (G), (H), (I) and (J) as defined below.

According to one embodiment, the image combiner 6 and/or the image histogram provider 8 may be integral part/parts of the image sensor 4.

According to one embodiment the calculator 10 may be implemented in the processor 14 of the camera 1.

Figure 2:
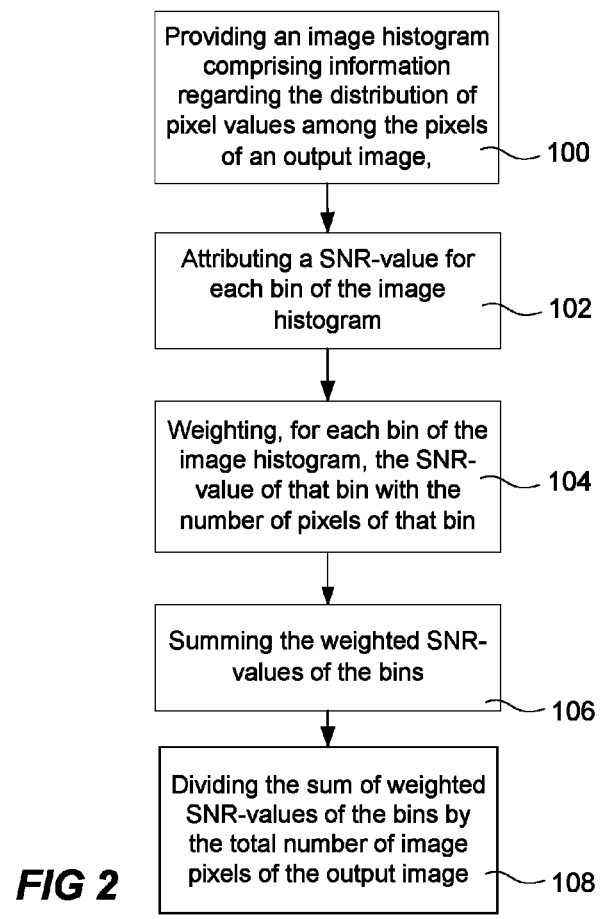
FIG. 2 is a schematic flow chart, showing a method according to an embodiment.

FIG. 2 illustrates an embodiment of a method for estimating a mean SNR value of an output image. The method comprises providing 100 an image histogram divided into bins, the image histogram comprising information regarding the distribution of pixel values among the image pixels of the output image, each bin comprising a set of image pixels having pixels values within a predetermined range. A SNR value for each bin of the image histogram is attributed 102. For each bin of the image histogram, the SNR value of that bin is weighted 104 with the number of image pixels in the set of image pixels of that bin. The weighted SNR values of the bins are summed 106, the sum then divided 108 by the total number of image pixels of the output image. As mentioned above, alternatively, the sum of weighted SNR values of the bins may be divided by the total number of image pixels in the bins of the image histogram.

According to one embodiment, the output image comprises image pixels having pixel values originating from image pixels of a plurality of images, such as for example, images having different exposure times. In order to obtain the pixel values of the image pixels of the output image, pixel values for some of the image pixels of the output image is taken from image pixels of a first image of the plurality of images. Other pixel values of the image pixels of the output image may be obtained by taking pixel values from image pixels of a second image of the plurality of images. And finally some of the pixel values of the image pixels of the output image may be obtained by combining pixel values from image pixels from both the first image and the second image of the plurality of images.

In case of the output image being an image stitched from a plurality of images, the act of attributing a SNR value for the bin of the bins of the image histogram includes combining SNR values for the pixel values of the image pixels from at least two images of the plurality of images. This is applicable where the image histogram includes image pixels having pixel values being obtained by combining pixel values of image pixels from at least two images of the plurality of images.

As mentioned above, the SNR value for a stochastic variable S is defined (definition used for imaging) as:

$$SNR = 20\left(\frac{\log(E[S])}{\sigma[S]}\right) \quad \text{Equation (A)}$$

where E[S] is the expectancy value of the signal, S, and σ is the standard deviation of the signal S. The signal, i.e. digital code output, or Analog to Digital Units (ADU), of the pixel value of each sensor pixel as being outputted from the image sensor is converted to the corresponding number of electrons generated using the sensor specific conversion factor $C_f$:

$$S_e = \frac{S_{digital} * C_f}{G_f} \quad \text{Equation (B)}$$

where $G_f$ is any analog or digital gain added to the signal before the image histogram is calculated.

For the calculation of the SNR value of each bin in the image histogram, the pixel value corresponding to each bin may be used as the expectancy value. This is a fair assumption as many of the image pixels in a bin have the same pixel value and possibly false contributions, which might occur for bins having a small number of image pixels, and may be weighted out later when calculating the mean SNR for an output image.

For the standard deviation of the signal, in this case the pixel value, read noise $\sigma_r$ and photon shot noise $\sigma_{ph}$ is only accounted for (since dark current is often removed by sensor using optically black reference sensor pixels). The skilled person realizes that further factors may come into account when estimating the standard deviation.

The read noise or may be pre-calculated for each sensor and may be dependent upon the temperature of the image sensor capturing the image, for example. The photon shot noise $\sigma_{ph}$ appears due to the fact that the number of photons incident on the sensor pixel is following a Poisson distribution. Therefore:

$$\sigma_{ph} = \sqrt{S_e} \quad \text{Equation (C)}$$

Aggregating these noise sources gives a total noise of:

$$\sigma_{tot} = \sqrt{\sigma_{ph}^2 + \sigma_r^2} = \sqrt{S_e^2 + \sigma_r^2} \quad \text{Equation (D)}$$

When stitching a plurality of images in order to achieve a stitched output image, pixel values of the image pixels of the stitched output image may be obtained by combining pixel values of image pixels from the plurality of images. For example, when forming a multi-exposure image (e.g., a multi-exposure HDR-image), pixel values of image pixels originating from images with different exposure times may be used. To calculate an estimated SNR value for each pixel value of each image pixel in the stitched output image, one needs to account for the image stitching performed. Pixel values of the image pixels of the stitched output image are taken from the plurality of images making up the stitched output image. For some image pixels of the stitched output image, pixel values from a first image of the plurality of images may be used and for some other image pixels of the stitched output image, pixel values from a second image of the plurality of images may be used. Furthermore, for some further image pixels of the stitched output image, an interpolated pixel value between pixel values from image pixels of at least two images of the plurality of images may be used. For the case of multi-exposure images, an interpolated pixel value between two image pixels of two neighboring exposures are used in order to obtain the pixel value of the image pixel having contributions from more than one of the plurality of images. For the image pixels having a pixel value obtained by interpolating pixel values from image pixels of at least two of the plurality of images, the noise from each pixel value from the at least two of the plurality of images is combined. Thus, the noise of a pixel value of an image pixel of the stitched output image being obtained by interpolating pixel values from image pixels of at least two of the plurality of images is the combined noise of the pixel values used to obtain the pixel value of that particular image pixel.

Below is an example of how to estimate the SNR value for an image pixel of a multi-exposure image where a pixel value is interpolated between two exposures $T_1$ and $T_2$. The pixel value is assumed to be a weighted (and scaled) value between the two exposures:

$$S = \alpha S[T_1] + \epsilon_r \beta S[T_2]; \; \alpha + \beta = 1 \quad \text{Equation (E)}$$

The weighting factors $\alpha$ and $\beta$ are chosen such that full weight is given to exposure $T_1$ at the $T_1$ endpoint where only the pixel value for the $T_1$ exposure is used and vice versa. The exposure time ratio $\epsilon_r$ is a known factor. The signal in the shorter exposure $T_2$ needs to be scaled to match the $T_1$ data. Furthermore, the following relationship is assumed:

$$S[T_2] = \frac{S[T_1]}{\epsilon_r} \quad \text{Equation (F)}$$

which effectively indicates that there is no motion in the image view between the two exposures $T_1$ and $T_2$. This gives a correct value on average.

For the aggregated signal converted to the corresponding number of electrons generated, the following equation is derived based on using Equations (B), (E) and (F):

$$\begin{aligned} S_e &= \frac{(\alpha S[T_1] + \epsilon_r \beta S[T_2]) \cdot C_f}{G_f} \quad \text{Equation (G)} \\ &= \frac{(\alpha + \beta) S[T_1] \cdot C_f}{G_f} \\ &= \frac{S[T_1] \cdot C_f}{G_f} \end{aligned}$$

Now to the standard deviation, the following property of standard deviations for uncorrelated stochastic variables is used:

$$\sigma[\alpha T_1 + \epsilon_r \beta T_2] = \sqrt{(\alpha)^2 \sigma[T_1]^2 + (\epsilon_r \beta)^2 \sigma[T_2]^2} \quad \text{Equation (H)}$$

Using Equations (D) and (G) gives the following equation:

$$\sigma[T_1] = \sqrt{\frac{S[T_1] \cdot C_f}{G_f} + \sigma_r^2} \quad \text{Equation (I)}$$

Using Equation (F) yields the following equation:

$$\sigma[T_2] = \sqrt{\frac{S[T_1] \cdot C_f}{G_f \cdot \epsilon_r} + \sigma_r^2} \quad \text{Equation (J)}$$

Equations (G), (H), (I) and (J) can then be used together with Equation (A) for pixel values in the image histogram to calculate the SNR value associated with a bin of the image histogram comprising image pixels of the stitched output image having that pixel value.

For image pixels of the stitched output image having a pixel value originating from just one of the plurality of images, the corresponding weighting factor may be set to zero.

The above method may also be applied in cases where there are more than two exposures yielding more than one interpolation region.

Additional detail regarding how to combine SNR values for image pixels of a multi-exposure image may be found in patent applications PG Pub US2009/0059039 and PG Pub US2010/0310190, which are incorporated into this application by reference as if fully set forth.

In the drawings and specification, there have been disclosed embodiments and examples of the invention and, although specific terms are employed, they are used in a generic and descriptive sense only and not for the purpose of limitation.

The invention claimed is:

1. A method for providing an estimation of a mean signal to noise ratio value for an output image comprising a number of image pixels, each image pixel of the output image having a pixel value, the method comprising:
   providing an image histogram divided into bins, the image histogram comprising information regarding the distribution of pixel values among the image pixels of the output image, each bin comprising a set of image pixels having pixels values within a predetermined range;
   attributing a signal to noise ratio value for each bin of the image histogram;
   weighting, for each bin of the image histogram, the signal to noise ratio value of that bin with the number of image pixels in the set of image pixels of that bin;
   summing the weighted signal to noise ratio values of the bins; and
   dividing the sum of weighted signal to noise ratio values of the bins by the total number of image pixels of the output image or the total number of image pixels in the bins of the image histogram.

2. The method according to claim 1, wherein the output image comprises image pixels having pixel values originating from image pixels of a plurality of images.

3. The method according to claim 2, wherein the plurality of images have been captured using different exposure times.

4. The method according to claim 2, wherein the pixel value for a first image pixel in the output image is a pixel value from an image pixel of a first image of the plurality of images and the pixel value for a second image pixel in the output image is a pixel value from an image pixel of a second image of the plurality of images.

5. The method according to claim 2, wherein a pixel value for at least one of the image pixels of the output image is a pixel value being obtained by combining pixel values of image pixels from at least two images of the plurality of images.

6. The method according to claim 5, wherein the act of attributing a signal to noise ratio value for the bin of the bins of the image histogram comprising the image pixel having a pixel value being obtained by combining pixel values of image pixels from at least two images of the plurality of images comprises combining signal to noise ratio values for the pixel values of the image pixels from the at least two images of the plurality of images.

7. A non-transitory computer-readable recording medium having recorded thereon a program that when executed by a device with processing capabilities, performs the following steps:
   providing an image histogram divided into bins, the image histogram comprising information regarding the distribution of pixel values among the image pixels of the output image, each bin comprising a set of image pixels having pixels values within a predetermined range;
   attributing a signal to noise ratio value for each bin of the image histogram;
   weighting, for each bin of the image histogram, the signal to noise ratio value of that bin with the number of image pixels in the set of image pixels of that bin;
   summing the weighted signal to noise ratio values of the bins; and
   dividing the sum of weighted signal to noise ratio values of the bins by the total number of image pixels of the output image or the total number of image pixels in the bins of the image histogram.

8. A camera arranged for providing an estimation of a mean signal to noise ratio value for an output image having a number of image pixels wherein each image pixel of the image has a pixel value, the camera comprising:
   an image sensor being arranged to capture pixel values used to derive pixel values of the image pixels of the output image;
   an image histogram provider being arranged to provide an image histogram comprising information regarding the distribution of pixel values among the image pixels of the output image, each bin of the image histogram comprises a set of image pixels having pixels values within a predetermined range;
   a signal to noise ratio value attributor being arranged to attribute a signal to noise ratio value for each bin of the image histogram; and
   a calculator being arranged to calculate the mean signal to noise ratio value by weighting, for each bin of the image histogram, the signal to noise ratio value of that bin with the number of image pixels in the set of image pixels of that bin, summing the weighted signal to noise ratio values of the bins, and dividing the sum of weighted signal to noise ratio values of the bins by the total number of image pixels of the output image or the total number of image pixels in the bins of the image histogram.

9. The camera according to claim 8, further comprising an image combiner being arranged to combine pixel values of image pixels originating from a plurality of images captured by the image sensor in order to form the output image.

10. The camera according to claim 9, wherein the plurality of images are captured using different exposure times.

11. The camera according to claim 9, wherein the image combiner is arranged to form the pixel value of a first image pixel of the output image using a pixel value from an image pixel of a first image of the plurality of images and to form the pixel value of a second image pixel of the output image using a pixel value from an image pixel of a second image of the plurality of images.

12. The camera according to claim 9, wherein the image combiner is arranged to combine pixel values from image pixels of at least two images of the plurality of images captured by the image sensor in order to form a pixel value for at least one image pixel of the image pixels of the output image.

13. The camera according to claim 12, wherein the signal to noise ratio value attributor is arranged to combine signal to noise ratio values of the pixel values of the image pixels of the at least two images of the plurality of images used to obtain the pixel values of the at least one image pixel of the image pixels of the output image in order to attribute the signal to noise ratio for the bin of the bins of the image histogram comprising the at least one image pixel of the image pixels of the output image.

14. The camera according to claim 8, further comprising a memory having tables of signal to noise ratio values as a function of pixel values or one or more predefined functions and parameter values for calculating signal to noise ratio values as a function of pixel values.

15. The camera according to claim 8, wherein the signal to noise ratio value for each bin of the image histogram is dependent upon the temperature of the image sensor.

* * * * *